April 3, 1951 M. S. BAKER 2,547,732
TRANSMISSION SYNCHRONIZER
Filed Jan. 24, 1947 3 Sheets-Sheet 1

INVENTOR.
MALVERN S. BAKER
BY Hauke & Hardesty
ATTORNEYS

April 3, 1951 M. S. BAKER 2,547,732
TRANSMISSION SYNCHRONIZER
Filed Jan. 24, 1947 3 Sheets-Sheet 2

INVENTOR.
MALVERN S. BAKER
BY
Hauke & Hardesty
ATTORNEYS

April 3, 1951  M. S. BAKER  2,547,732
TRANSMISSION SYNCHRONIZER
Filed Jan. 24, 1947  3 Sheets-Sheet 3

INVENTOR.
MALVERN S. BAKER
BY
Hauke & Hardesty
ATTORNEYS

Patented Apr. 3, 1951

2,547,732

UNITED STATES PATENT OFFICE 2,547,732

TRANSMISSION SYNCHRONIZER

Malvern S. Baker, Muskegon, Mich., assignor to Continental Motors Corporation, Detroit and Muskegon, Mich., a corporation of Virginia Application January 24, 1947, Serial No. 724,000

3 Claims. (Cl. 192—53)

This invention relates to a transmission synchronizer.

Transmissions such as are used in marine power applications must be quickly reversible from full speed forward to full speed astern. It is an object of this invention to provide a transmission for marine use which may be quickly and easily reversed in direction. This object is accomplished in a gear train which embodies two clutches, one for forward speed and one for reverse. The clutches are engaged with the help of a ball or a plurality of balls rolling on inclined grooves between two clutch actuating members. The clutches serve to synchronize the speed of gears of the transmission which are engaged to carry the normal drive load.

Figure 1:
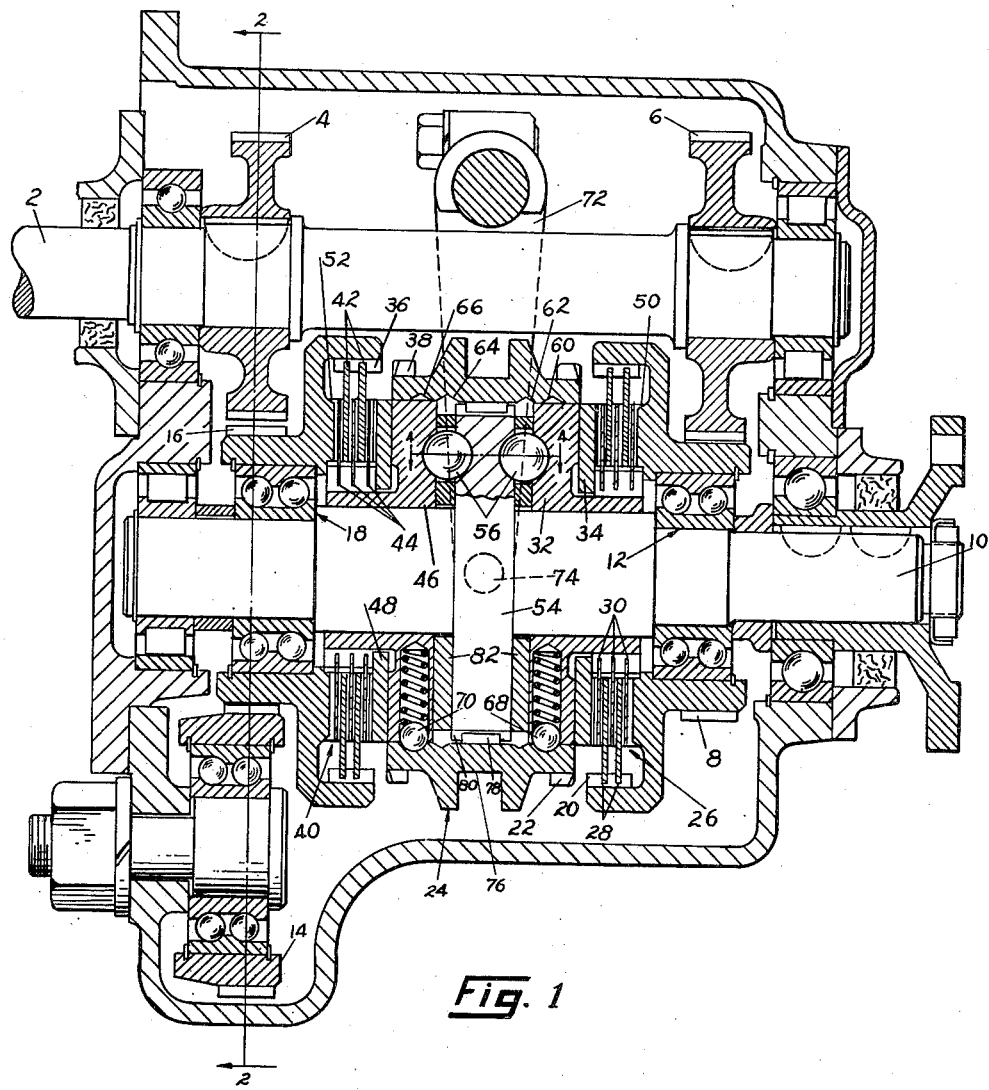
Fig. 1 is a view in section on line 1—1 of Fig. 2.

Referring now in detail to the drawings, the engine driven shaft 2 is shown as having two power gears 4 and 6 keyed thereto. Power gear 6 meshes with the gear 8 which is rotatable freely on output shaft 10 by means of bearing 12. Power gear 4 meshes with idler gear 14 which in turn meshes with gear 16. Gear 16 is freely rotatable on output shaft 10 by means of bearing 18.

Gear 8 is integral with an internal gear 20 which is in position to be engaged by external gear 22 on the shifter member 24. A multiple disc clutch indicated generally at 26 has one set of discs 28 which are non-rotatable relatively to gear 20 because of their cooperation with the teeth of that gear. Clutch 26 has other discs 30 which are similarly non-rotatable relatively to the hub of a clutch actuating member 32. A thrust plate 34 is provided between one face of clutch actuating member 32 and the clutch.

Similarly gear 16 has integral therewith an internal gear 36 which is in position to be engaged by the external gear 38 on the shifter member 24. A multiple disc clutch indicated generally at 40 has one set of discs 42 which engage the internal teeth of gear 36 and another set of plates 44 which engage teeth on clutch actuating member 46. Thrust plate 48 is interposed between one face of clutch actuating member 46 and the clutch.

The discs of clutch 26 are compressed between thrust plate 34 and a clutch reaction member 50 which is integral with gears 8 and 20. Similarly, the discs of clutch 40 are compressed between thrust plate 48 and a clutch reaction member 52 which is integral with gears 16 and 36.

Figures 3, 4:
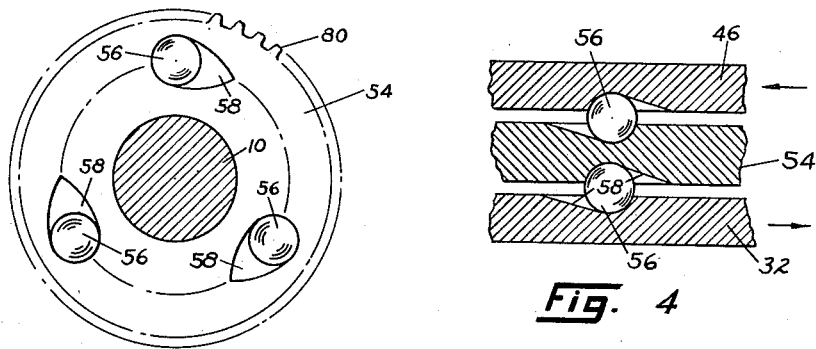
Fig. 3 is a detail view showing the clutch-actuating member which is not movable axially.
Fig. 4 is a detail view substantially on line 4—4 of Fig. 1, with the ball races omitted.

Clutch actuating members 32 and 46 are axially displaceable relatively to their respective clutch reaction members 50 and 52. A clutch actuating member 54 is integral with output shaft 10 and is not axially displaceable relatively to either clutch reaction member 50 or 52. The clutch actuating members 32, 46 and 54 are recessed to receive clutch actuating balls 56. These recesses are provided with inclined grooves 58 as shown in Fig. 4. These grooves are provided at an angle to the plane of the face of clutch actuating member 54. If desired, the entire angle could be provided in one of the two cooperating clutch actuating members, but in order to insure against slipping, the angle is divided; part of it is provided in clutch actuating member 32 and the remainder in clutch actuating member 54. Similarly, the inclined groove is provided in both clutch actuating members 46 and 54. In order that the clutches 26 and 40 not be self energizing, the combined angle which the two inclined grooves 58 form with the plane of the face of the clutch actuating member must be greater than that angle at which the cam action (product of the torque and the cotangent of the angle) equals the pressure on the clutch plates to hold the full torque. What the combined angle is will depend on the coefficient of friction of the clutch plates.

The interior of shifter member 24 is provided with annular grooves 60, 62, 64 and 66. Grooves 60 and 62 are positioned to cooperate with ball detent 68 and grooves 64 and 66 are positioned to cooperate with ball detent 70. With ball detents 68 and 70 in grooves 60 and 66 respectively, the transmission is in neutral.

A shifter fork 72 having fingers, one of which is shown in dotted lines at 74, cooperates with annular groove 76 of shifter member 24 to move the shifter member axially in shifting the transmission between forward and astern speeds. Internal splines 78 in the shifter member cooperate with external splines 80 on clutch actuating member 54 to maintain the shifter member 24 in non-rotative relation with respect to clutch actuating member 54.

A spacer or ball race 82 is provided between clutch actuating members 54 and 32, and 54 and 46.

Figure 2:
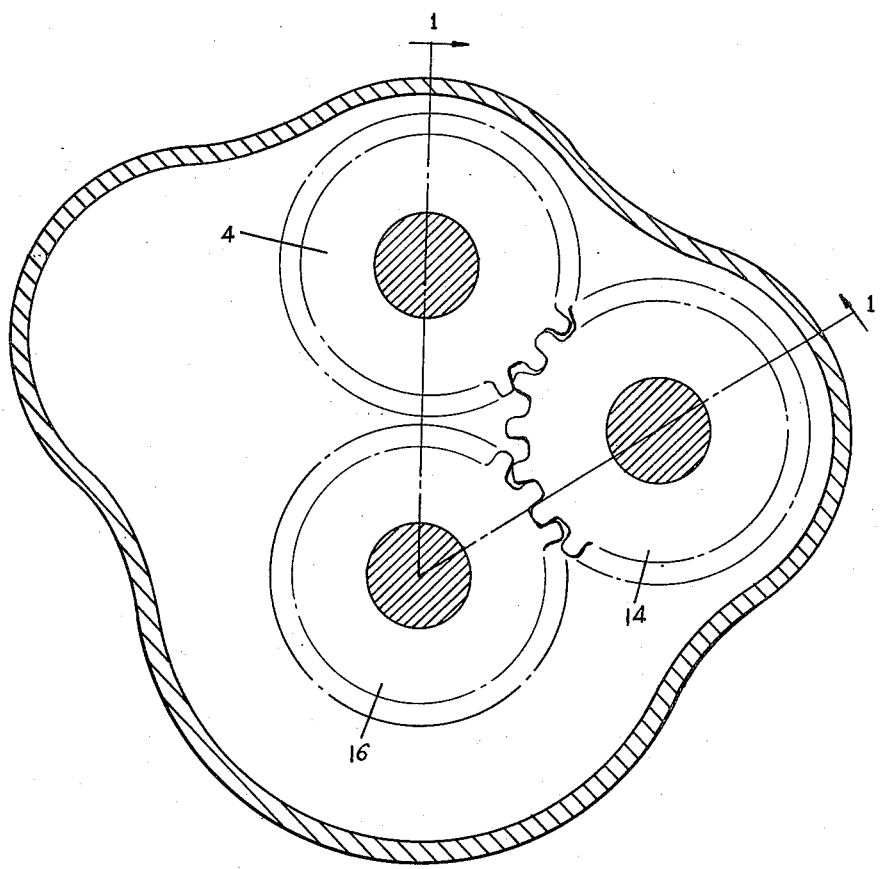
Fig. 2 is a view in section on line 2—2 of Fig. 1.

With the gears shown in Figs. 1 and 2, the transmission is designed for a 1:1 drive ratio. In view of the necessity for clearance between gears 4 and 16, the ratio in one direction will be slightly less than 1:1. However, the ratio will still be close enough to 1:1 so that it may be considered a direct drive for all practical purposes.

In the arrangement shown in Fig. 1, gears 6, 8 and 16 have the same number of teeth, but gear 4 is slightly smaller. Gears 8 and 16 are identical and are interchangeable. Gears 4 and 6 are not interchangeable. The gear arrangement shown in Figs. 1 and 2 is preferred in marine applications which require a small propeller rotating at relatively high speed, such as would be called for in pleasure craft.

Figure 5:
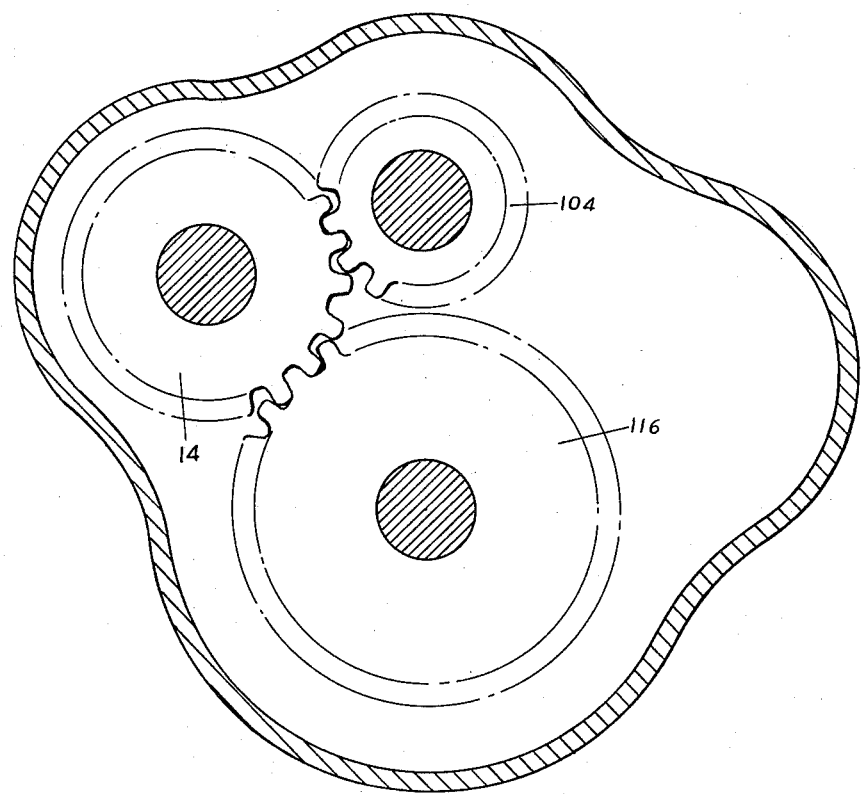
Fig. 5 is a view similar to that of Fig. 2, but showing the transmission with gears for a 2:1 reduction.

In tugs and the like, where power rather than speed is called for, it is desirable to have a large propeller rotating at a relatively slower speed. For these applications, the power gears are made smaller and the countershaft gears are made larger. The actual ratio can of course be varied within rather wide limits. In Fig. 5 there is shown a gear arrangement which provides substantially a 2:1 ratio of engine speed to propeller shaft speed. In the embodiment shown in Fig. 5, gear 104 is approximately half as large as gear 116. In order to accommodate these new gear sizes, the idler gear 14 has been moved over to the left side of the gear casing as seen in Fig. 5. It will of course be understood that similar gears (not shown) will be provided at the other end of the transmission, but meshing directly rather than through an idler gear.

Operation

For purposes of convenience, it will be considered that gears 6 and 8 are connected for reverse drive and gears 4 and 16 are connected, through the idler, for forward speed. With the transmission in neutral, as seen in Fig. 1, shifter fork 72 is actuated to move the shifter member 24 to the left. Through the spring-biased ball detent 70, this movement of shifter member 24 to the left tends to move clutch actuating member 46 to the left. The plates 42 and 44 of clutch 40 begin to become engaged and gear 16 begins to drive clutch actuating member 46 through the clutch. As clutch actuating member 46 begins to rotate, the balls 56 begin to ride in their groove upward toward the faces of clutch actuating members 54 and 46, thus tending to spread the clutch actuating members 54 and 46 apart, moving the clutch actuating member 46 toward its cooperating clutch reaction member 52, and further compressing the clutch plates. This tends to still better engage the clutch 40, until clutch 40 is substantially fully engaged. It will be understood by those skilled in the art that the drive could be accomplished entirely through the clutch 40. However, it is preferable to provide a positive drive and to relieve the clutch 40 of the normal drive load. to this end shifter member 24 is provided with a ring gear 38 which engages the internal teeth of a gear 36, integral with the gear 16. As the two gears 36 and 38 become engaged, ball detent 70 snaps out of groove 66 and into groove 64, and holds the shifter member 24 in position for forward speed.

To disengage the transmission from forward speed drive and return it to neutral, the engine is momentarily throttled to take torque off the drive shaft 2, whereupon shifter fork 72 is actuated to move shifter member 24 to the right as seen in Fig. 1. As this shifting movement is effected, shifter member 24 moves clutch actuating member 46 away from the clutch engaging position through the ball detent 70 and its cooperating grooves 64 and 66.

The operation in shifting into and out of reverse will be similar to the forward speed shift just described, and need not be detailed here.

I claim:

1. In a reversing transmission, a driving member provided with a driving gear, an output shaft, an axially fixed torque transmitting member carried by said output shaft, a shiftable clutch member having an axially movable and non-rotatable connection with said torque transmitting member and carrying a gear adapted for connection with the driving gear, a ring member axially slidably supported on said output shaft, said shiftable clutch member being slidably and rotatably mounted on said ring member, a clutching assembly intermediate said ring member and the driving member, a yielding connection between said shiftable clutch member and the ring member yieldingly locking same together against axial displacement, and means interconnecting said ring member and said torque transmitting member, which means is adapted to increase clutch engagement between the ring member and driving member under torque applied to said ring member, the initial axial movement of said shiftable member simultaneously moving said ring member by reason of said yielding connection to initiate the clutch engagement aforesaid, said yielding connection permitting relative axial movement of said ring member and shiftable member on further actuation of the shiftable member to engage the gear carried thereby with said driving gear.

2. In a reversing transmission, a driving member provided with a driving gear, an output shaft, an axially fixed torque transmitting member carried by said output shaft, a shiftable clutch member having an axially movable and non-rotatable connection with said torque transmitting member and carrying a gear adapted for connection with the driving gear, a ring member axially slidably supported on said output shaft, said shiftable clutch member slidably and rotatably mounted on said ring member, a clutching assembly intermediate said ring member and the driving member, a yielding connection between said shiftable clutch member and the ring member yieldingly locking same together against axial displacement, and means interconnecting said ring member and said torque transmitting member, which means is adapted to increase clutch engagement between the ring member and driving member under torque applied to said ring member, the initial axial movement of said shiftable member simultaneously moving said ring member by reason of said yielding connection to initiate the clutch engagement aforesaid, said yielding connection permitting relative axial movement of said ring member and shiftable member on further actuation of the shiftable member to engage the gear carried thereby with said driving gear, said yielding connection comprising a spring biased ball carried by the ring member and engaged in an annular internal groove carried by the shiftable member.

3. In a reversing transmission, a driving member provided with a driving gear, an output shaft, an axially fixed torque transmitting member carried by said output shaft, a shiftable clutch member having an axially movable and non-rotatable connection with said torque transmitting member and carrying a gear adapted for connection with the driving gear, a ring member axially slidably supported on said output shaft, said shiftable clutch member slidably and rotatably mounted on said ring member, a clutching assembly intermediate said ring member and the driving member, a yielding connection between said shiftable clutch member and the ring member yieldingly locking same together against axial displacement, and means interconnecting said ring member and said torque transmitting member, which means is adapted to increase clutch engagement between the ring member and driving member under torque applied to said ring member, the initial axial movement of said shiftable member simultaneously moving said ring member by reason of said yielding connection to initiate the clutch engagement aforesaid, said yielding connection permitting relative axial movement of said ring member and shiftable member on further actuation of the shiftable member to engage the gear carried thereby with said ring gear, said yielding connection comprising a spring biased ball carried by the ring member and engaged in an annular internal groove carried by the shiftable member, said shiftable member having a pair of axially spaced internal grooves, one groove engaged by said spring biased ball to yieldingly lock said shiftable member into drive relation with said driving gear on disengagement of said clutching assembly.

MALVERN S. BAKER.

REFERENCES CITED

The following references are of record in the file of this patent:

UNITED STATES PATENTS

| Number | Name | Date |
| --- | --- | --- |
| 1,730,362 | Gaylord | Oct. 8, 1929 |
| 1,836,773 | Salerni | Dec. 15, 1931 |
| 2,052,650 | Pearmain | Sept. 1, 1936 |
| 2,152,552 | Lindstrom | Mar. 28, 1939 |
| 2,190,964 | White | Feb. 20, 1940 |
| 2,338,428 | Guter et al. | Jan. 4, 1944 |
| 2,375,524 | Clarke | May 8, 1945 |